US008612934B2

(12) United States Patent
Thompson

(10) Patent No.: US 8,612,934 B2
(45) Date of Patent: *Dec. 17, 2013

(54) VIRTUAL TYPING EXECUTABLES

(75) Inventor: Robert W. Thompson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/452,485

(22) Filed: Apr. 20, 2012

(65) Prior Publication Data

US 2012/0210297 A1 Aug. 16, 2012

Related U.S. Application Data

(63) Continuation of application No. 12/411,018, filed on Mar. 25, 2009, now Pat. No. 8,429,603.

(51) Int. Cl.
*G06F 9/44* (2006.01)

(52) U.S. Cl.
USPC .......................................... 717/111; 717/110

(58) Field of Classification Search
USPC .......................................... 717/110, 111, 124
See application file for complete search history.

(56) References Cited

U.S. PATENT DOCUMENTS

| 5,761,510 A | 6/1998 | Smith et al. |
|---|---|---|
| 6,178,452 B1 | 1/2001 | Miyamoto |
| 6,178,548 B1 | 1/2001 | Hickman et al. |
| 6,202,208 B1 | 3/2001 | Holiday, Jr. |
| 6,499,137 B1 | 12/2002 | Hunt |
| 6,701,515 B1 | 3/2004 | Wilson et al. |
| 6,802,059 B1 | 10/2004 | Lyapustina et al. |
| 7,017,151 B1 | 3/2006 | Lopez et al. |
| 7,055,062 B2 | 5/2006 | Shah et al. |
| 7,334,221 B1 | 2/2008 | Shapiro |
| 7,500,227 B1 | 3/2009 | Fontana et al. |
| 7,627,194 B2 | 12/2009 | Park |
| 7,784,044 B2 | 8/2010 | Buban et al. |
| 8,429,603 B2 | 4/2013 | Thompson |
| 2002/0019973 A1 | 2/2002 | Hayashida |
| 2004/0040016 A1 | 2/2004 | Pearce et al. |
| 2004/0107416 A1* | 6/2004 | Buban et al. ............... 717/170 |
| 2004/0230971 A1 | 11/2004 | Rachman et al. |
| 2006/0034530 A1 | 2/2006 | Park |

(Continued)

FOREIGN PATENT DOCUMENTS

EP 2071453 A1 6/2009

OTHER PUBLICATIONS

Jeng, "An Approach to Designing Reusable Service Frameworks via Virtual Service Machine", SSR '01, Proceedings of the 2001 Symposium on Software Reusability: Putting Software Reuse in Context, Toronto, Ontario, Canada, May 18-20, 2001, pp. 58-66.

(Continued)

*Primary Examiner* — Anna Deng
(74) *Attorney, Agent, or Firm* — Yee & Associates, P.C.; John D. Flynn

(57) ABSTRACT

A method for modifying a computer program. According to one embodiment, a new value to replace a value associated with a virtual type in a computer program is received. The new value is received during execution of the computer program by a processor unit. The replacement of the value by the new value modifies the computer program while the computer program is executed by the processor.

7 Claims, 16 Drawing Sheets

(56) References Cited

U.S. PATENT DOCUMENTS

| | | |
|---|---|---|
| 2008/0083030 A1 | 4/2008 | Durham et al. |
| 2008/0127119 A1 | 5/2008 | Kasman |
| 2009/0106748 A1 | 4/2009 | Chess et al. |
| 2009/0327994 A1 | 12/2009 | Christensen et al. |
| 2010/0250745 A1 | 9/2010 | Thompson |
| 2010/0281466 A1 | 11/2010 | Remollino |
| 2011/0145806 A1 | 6/2011 | Cook |
| 2011/0173600 A1 | 7/2011 | Thompson |

OTHER PUBLICATIONS

Kim et al., "From Product Lines to Self-Managed Systems: An Architecture-Based Runtime Reconfiguration Framework", DEAS '05, Proceedings of the Workshop on the Design and Evolution of Autonomic Application Software, St. Louis, Missouri, May 21, 2005, 7 pages.

Brereton et al., "The Future of Software", Communications of the ACM, 42(12):78-84, Dec. 1999.

Griffith et al., "Manipulating Managed Execution Runtimes to Support Self-Healing Systems", DEAS '05 Proceedings of the Workshop on the Design and Evolution of Autonomic Application Software, St. Louis, Missouri, May 21, 2005, 7 pages.

Office Action issued on Jul. 24, 2012 regarding U.S. Appl. No. 12/411,018, 19 pages.

Non-final office action dated Mar. 22, 2013 regarding U.S. Appl. No. 13/072,434, 25 pages.

Notice of Allowance issued on Dec. 20, 2012 for U.S. Appl. No. 12/411,018, 17 pages.

Response to Office Action filed on Oct. 8, 2012 for U.S. Appl. No. 12/411,018, 11 pages.

Notice of allowance dated Aug. 12, 2013 regarding U.S. Appl. No. 13/072,434, 19 pages.

Beazley, "Swig: An Easy to Use Tool for Integrating Scripting Languages with C and C++," Proceedings of the USENIX Fourth Annual Tcl/Tk Workshop, Monterey, CA, Jul. 1996, 18 pages, accessed Aug. 1, 2013 http://static.usenix.org/publications/library/proceedings/tcl96/full_papers/beazley/.

Proebsting et al., "Toba: Java for Applications A Way Ahead of Time (WAT) Compiler," Proceedings of the Third USENIX Conference on Object-Oriented Technolgies and Systems, Portland, OR, Jun. 1997, 14 pages, accessed Aug. 1, 2013, https://www.usenix.org/legacy/publications/library/proceedings/coots97/full_papers/proebsting/proebsting.pdf.

* cited by examiner

```
#include <stdlib.h>
#include <stdio.h>
#include <unistd.h>                          400
#include <string.h>
#include <sys/errno.h>
#include <fcntl.h>
include "virtual_type.h"  ←— 800 main(argc, argv)
int argv;
char *argv[];
{
   int  j;
   char  *string;
   int  c,x,y,z;
   int  listflag=0;

initialize_virtual_types();

/*get switch option*/
   while ((c = getopt(argc, argv, "ls:?")) != EOF)
   {
      switch(c)
      {
           case 's':
           string = optarg;
           printf("inputted string: %s \n", string);
           process_tokens(string);
           break;

case 'l':
           listflag=1;
           break;

802      case '?':
           printf( "usage: %s [-s \"string\"] [-l] \n", argv[0] );
           printf( "where \"string\" is virtual type strings \n");
           printf( "where \"-l\" gives list of virtual types \n");
           exit(0);
           break;

default:
           printf( "usage: %s -s \"string\" -l \n", argv[0] );
           printf( "where \"string\" is virtual type strings \n");
           printf( "where \"-l\" gives list of virtual types \n");
           exit(0);
           break;

}
   }
```

| FIG. 8A |
|---------|
| FIG. 8B |

```
        /* z = 2; */
804 ~~► z =VTCNT(1,2);
        printf(" z(%d) is suppose to be 7\n",z);

x = 3;
        /* if ( x == 3 ) */
806 ~~► if (VTCMP(1,x,_EQ_,3))
        {
                printf(" x(%d) is equal to 4 \n",x);
        }
        else
        {
                printf(" x(%d) is not equal to 4\n",x);
        } y = 5;
        /* if ( y == 5 ) */
808 ──► if (VTCMP(2,y,_EQ_,VTCNT(2,5)))
        {
            printf(" \n y(%d) is not equal to 5\n",y);
        }
        else
        {
            printf(" \n y(%d) is equal to 5\n",y);
        } if (listflag)
        {
            list_virtual_types();
        }
    }
```

*FIG. 8B*

```
#define MAXVAR 40
#define MAXCP 40
#define MAXCT 40
#define MAXOP 40

/* compare symbols (used with CMPSYM) */
#define _LT_ 1
#define _GT_ 2
#define _EQ_ 3
#define _NEQ_ 4
#define _LTEQ_ 5
#define _GTEQ_ 6

/* operation symbols (used with VTOP) */
#define _PLUS_ 1
#define _MINUS_ 2
#define _TIMES_ 3
#define _DIVIDE_ 4
#define _SHIFT_R_ 5
#define _SHIFT_L_ 6
#define TOTALOPLIST 6

/* defines for func01 */
define _F01_ 1 define _0_ 0
define _1_ 1
#define _i_ 2
#define _j_ 3
#define _k_ 4
#define _tmp1_ 5
#define _tmp2_ 6
#define _tmp3_ 7
define TOTALFUNC01VARLIST 8 long vtctpar[MAXCT+1];
long vtctdef[MAXCT+1];
int vtcppar[MAXCP+1];
int vtcpdef[MAXCP+1];
int vtoppar[MAXOP+1];
int vtopdef[MAXOP+1];
```

Virtual_types.h
900

*FIG. 9A*

| FIG. 9A |
| FIG. 9B |
| FIG. 9C |
| FIG. 9D |
| FIG. 9E |
| FIG. 9F |
| FIG. 9G |
| FIG. 9H |

*FIG. 9*

```
/* arrays for func01 */
int vtvarfunc01par[MAXVAR+1];
int vtvarfunc01def[MAXVAR+1];
void* vtvarfunc01storage[MAXVAR+1];

#define VTCTPAR(INDEX,CONST) vtctpar[INDEX]=CONST
define VTCPPAR(INDEX,CMPSYM) vtcppar[INDEX]=CMPSYM define CT(INDEX,CNST) \
{\
   vtctdef[INDEX] = CNST; \
      ((vtctpar[INDEX] != -1) ? vtctpar[INDEX] : vtctdef[INDEX]) \
} void initialize_virtual_types();
void getparameters(char * atoken, int *parameter1, int *paramter2);
void getparameters3(char * atoken, int *parameter1, int *paramter2, int *parameter3);
void process_tokens(char* string);
void list_virtual_types();
void initialize_virtual_types()
{
  int i;
  for (i=0; i< (MAXCP+1); i++)
  {
    vtcppar[i]=0;
    vtcpdef[i]=0;
  }
  for (i=0; i< (MAXCT+1); i++)
  {
    vtctpar[i]= -1;
    vtctdef[i]= -1;
  }
  for (i=0; i< (MAXOP+1); i++)
  {
    vtoppar[i]=0;
    vtopdef[i]=0;
  }
  for (i=0; i< (MAXVAR=1); i++)
  {
    vtvarfunc01par[i]= -1;
    vtvarfunc01def[i]= -1;
  }
} void list_virtual_types()
{
```

*FIG. 9B*

```
int i;
printf("\n Virtual Type Default List:\n");
for (i=0; i< (MAXCP+1; i++)
{
   if (vtcpdef[i]!=0)
   {
      printf("\t vtcp(%d,%d)\n",i,vtcpdef[i]);
   }
}
for (i=0; i< (MAXCT+1); i++)
{
   if (vtctdef[i]!= -1)
   {
      printf("\t vtct(%d%d)\n",i,vtctdef[i]);
   }
}
for (i=0; i< (MAXOP+1); i++)
{
   if (vtopdef[i]!=0)
   {
      printf("\t vtop(%d,%d)\n",i,vtopdef[i]);
   }
}
for (i=0; i < (MAXVAR+1); i++)
{
   if (vtvarfunc01def[i]!= -1)
   {
      printf("\t vtvar(%d,1,%d)\n",i,vtvarfunc01def[i]);
   }
}
}
int vtcp(int index,long exp1,int cmpsym,long exp2, int cmpsympar);
int vtop(int index,long exp1,int opsym,long exp2, int opsympar);
long* vtvarp(int index, int funcnum, int varsym, int varsympar);

#define VTCMP(INDEX,EXP1,CMPSYM,EXP2) \
   vtcp(INDEX,EXP1,CMPSYM,EXP2,vtcppar[INDEX])

#define VTCNT(INDEX,CTDEF) \
   vtct(INDEX,CTDEF,vtctpar[INDEX])

#define VTOP(INDEX,EXP1,OPSYM,EXP2) \
   vtop(INDEX,EXP1,OPSYM,EXP2,vtoppar[INDEX])

#define VTVARP(INDEX,FUNC,VARDEF) \
   vtvarp(INDEX,FUNC,VARDEF,vtvarfunc01par[INDEX])
```

*FIG. 9C*

```
void getparameters(char * atoken, int *parameter1, int *parameter2)
{
  char  *string,*p,*p1,*p2;

p1=strchr(atoken,'(');
  p1++;
  *parameter1 = atoi(p1);
  p2=strchr(atoken,',');
  p2++;
  *parameter2 = atoi(p2);
} void getparameters3(char * atoken, int *parameter1, int *parameter2,
                    int *parameter3)
{
  char  *string,*p,*p1,*p2,*p3;

p1=strchr(atoken,'(');
  p1++;
  *parameter1 = atoi(p1);
  p2=strchr(atoken,',');
  p2++;
  *parameter2 = atoi(p2);
  p3=strrchr(atoken,',');
  p3++;
  *parameter3 = atoi(p3);
} void process_tokens(char* string)
{
  int n = 1;
  int j,index, value, funcno;
  char  *p,*p1,*p2;
  char  *tokenp[40];
  printf("inputted string: %s \n",string);
  tokenp[n] = strtok(string,":");
  n++;
  while (tokenp[n] = strtok(NULL,":"))
  {
    n++;
  }
  n--;
  /* process each token */
  for (j = 1; j < (n+1) ; j++)
  {
```

*FIG. 9D*

```
if (p=strstr(tokenp[j],"vtcp"))
{
getparameters(p, &index, &value);
printf("string p: %s\n",p);
printf("index: %d\n",index);
printf("value: %d\n",value);
vtcppar[index]=value;
}
else if (p=strstr(tokenp[j],"vtct"))
{
getparameters(p, &index, &value);
printf("string p: %s\n",p);
printf("index: %d\n",index);
printf("value: %d\n",value);
vtctpar[index]=value;
}
else if (p=strstr(tokenp[j],"vtop"))
{
getparameters(p, &index, &value);
printf("string p: %s\n",p);
printf("index: %d\n",index);
printf("value: %d\n",value);
vtoppar[index]=value;
}
else if (p=strstr(tokenp[j],"vtvar"))
{
getparameters3(p, &index, &funcno, &value);
```

*FIG. 9E*

```
            switch(funcno)
            {
            /* We are in func01 */
              case 1:
                if ((value >= 0) && (value < TOTALFUNC01VARLIST))
                {
                   vtvarfunc01par[index]=value;
                }
                else
                {
                   printf("cmp(): bad value passed exiting\n");
                   exit(-1);
                }
                break;
              default:
                    printf("cmp(): bad function number passed exiting\n");
                      exit(-1);
                break;
          }
         }
        }
      } int vtcp(int index,long exp1,int cmpsym,long exp2, int cmpsympar)
     {
         int bool = 0;

vtcpdef[index]=cmpsym;
         vtcppar[index]=cmpsympar;

switch((vtcppar[index] ? vtcppar[index]:vtcpdef[index]))
```

*FIG. 9F*

```
{
  case _LT_:
  bool = (exp1 < exp2);
    break;
  case _GT_:
  bool = (exp1 > exp2);
    break;
  case _EQ_:
  bool = (exp1 == exp2);
    break;
  case _NEQ_:
  bool = (exp1 != exp2);
    break;
  case _LTEQ_:
  bool = (exp1 <= exp2);
    break;
  case _GTEQ_:
  bool = (exp1 >= exp2);
    break;
  default:
  printf("cmp(): bad cmp symbol\n");
    break;
 } return(bool);
} long vtct(int index,long constdef,long constpar)
{
   int retct = -1;

vtctdef[index]=constdef;
   vtctpar[index]=constpar;
   retct = ((vtctpar[index] != -1) ? vtctpar[index]:vtctdef[index]);

return(retct);
} long vtop(int index,long exp1,int opsym,long exp2, int opsympar)
{
   long result = 0;

vtopdef[index]=opsym;
   vtoppar[index]=opsympar;
```

*FIG. 9G*

```
switch((vtoppar[index] ? vtoppar[index]:vtopdef[index]))
  {
    case _PLUS_:
    result = (exp1 + exp2);
      break;
    case _MINUS_:
    result = (exp1 - exp2);
      break;
    case _TIMES_:
    result = (exp1 * exp2);
      break;
    case _DIVIDE_:
    result = (exp1 / exp2);
      break;
    case _SHIFT_R_:
    result = (exp1 >> exp2);
      break;
    case _SHIFT_L_:
    result = (exp1 << exp2);
      break;
    default:
    printf("op(): bad op symbol\n");
    result=0;
      break;
  }
  return(result);
}
long * vtvarp(int index, int funcnum, int varsym, int varsympar)
{
  int i = -1;
  void* addr = NULL;
  switch(funcnum)
  {
    /* We are in func01 */
    case 1:
  vtvarfunc01def[index]=varsym;
  vtvarfunc01par[index]=varsympar;
  i = ((vtvarfunc01par[index] != -1) ? vtvarfunc01par[index]:vtvarfunc01def[index]);
      break;
    default:
    printf("cmp(): bad function number passed\n");
      return(NULL);
      break;
  }
  addr = vtvarfunc01storage[i];
  return(addr);
}
```

*FIG. 9H*

VIRTUAL TYPING EXECUTABLES

This application is a continuation of application Ser. No. 12/411,018, filed Mar. 25, 2009, issued as U.S. Pat. No. 8,429,603.

BACKGROUND

1. Field

The present disclosure relates generally to an improved data processing system, and more particularly, to a computer-implemented method, an apparatus and a computer program product for modifying a computer program.

2. Description of the Related Art

The dynamic nature of business environments today requires quick responses to repair computer programs. Traditional approaches used by software developers and support persons to facilitate a quick response involve sending a packaged fix across the network to the system executing the failing computer program. This fix, often referred to as a patch, is a new executable of the computer program. Typically, once this patch is installed, the lines of code where the error is occurring are replaced by the patch. After a patch is installed, a restart or a reboot of the computer system and computer program is usually required. Other techniques used by developers include using tuning options to create self-fixing executables. These tuning options, or chicken switches, provide ways to traverse pre-planned code paths to determine where in the computer program the error is occurring.

SUMMARY

The illustrative embodiments provide a method, computer program product, apparatus, and data processing system for modifying a computer program. According to one embodiment, a new value to replace a value associated with a virtual type in a computer program is received. The new value is received during execution of the computer program by a processor unit that executes the computer program. The replacement of the value, associated with the computer program, by the new value modifies the computer program while the computer program is executed by the processor unit.

According to another embodiment, a method receives an identification of an error in a computer program having a virtual type. The identification of the error is received while the computer program is executed by a processor unit. In response to receiving the identification of the error, a modification to fix the error in the computer program is identified. The modification is implemented in the computer program by sending an instruction string to the computer program, the instruction string comprising a command line switch and instructions having a new value. The new value replaces the value associated with the virtual type. The computer program receives the instruction string and replaces the value associated with the virtual type with the new value.

In another embodiment, a computer program product comprises a computer recordable storage medium. The computer recordable storage medium stores program code for receiving a new value to replace a value associated with a virtual type in a computer program. Additional computer program code is stored to replace the value associated with the virtual type with a new value. The replacement of the value by the new value modifies the computer program. This modification to the computer program is implemented while the computer program is executed by the processor.

In yet another embodiment, an apparatus comprises a computer program having a virtual type, a header file comprising a value associated with the virtual type, and a number of storage devices. The computer program and the header file are located on the number of storage devices. The computer program is in a form that is capable of being executed by a processor unit and is capable of receiving an instruction string comprising a command line switch and instructions. The instructions comprise a new value for replacing the value associated with the virtual type. When the instruction string is received by the computer program, the computer program replaces the value of the virtual type with the new value which modifies the computer program. The computer program is modified while the computer program is executing.

In another embodiment a data processing system comprises a bus system, a communications system coupled to the bus system, a memory comprising a set of instructions, and a processor unit connected to the bus system that executes the set of instructions to receive a new value to replace a value associated with a virtual type in the computer program, during execution of the computer program by the processor unit. The computer program is modified when the value is replaced by a new value. The computer program is modified while the computer program is executed by the processor unit.

BRIEF DESCRIPTION OF THE SEVERAL VIEWS OF THE DRAWINGS

FIG. 8 is a computer program code listing, in accordance with an illustrative embodiment; and FIG. 9 is a computer program code listing of a header file, which is associated with a computer program, in accordance with an illustrative embodiment.

DETAILED DESCRIPTION

Figure 1:
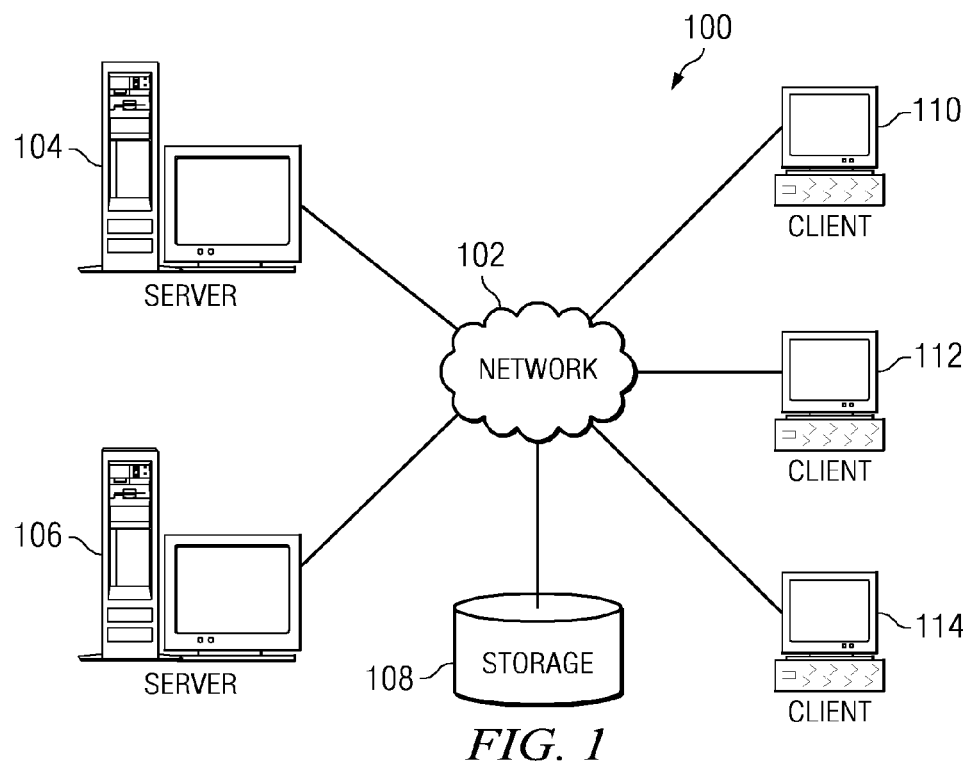
FIG. 1 is a pictorial representation of a network of data processing systems in which an illustrative embodiment may be implemented.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, embodiments of the present invention may take the form of a computer program product embodied in any tangible medium of expression having computer-usable program code embodied in the medium.

Any combination of one or more computer-usable or computer-readable storage medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program may be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that may contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of embodiments of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine such that the instructions, which execute via the processor of the computer, or other programmable data processing apparatus, create means for implementing the functions/acts specified in the flowchart and/or block diagram block or blocks. These computer program instructions may also be stored in a computer-readable medium that may direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 2:
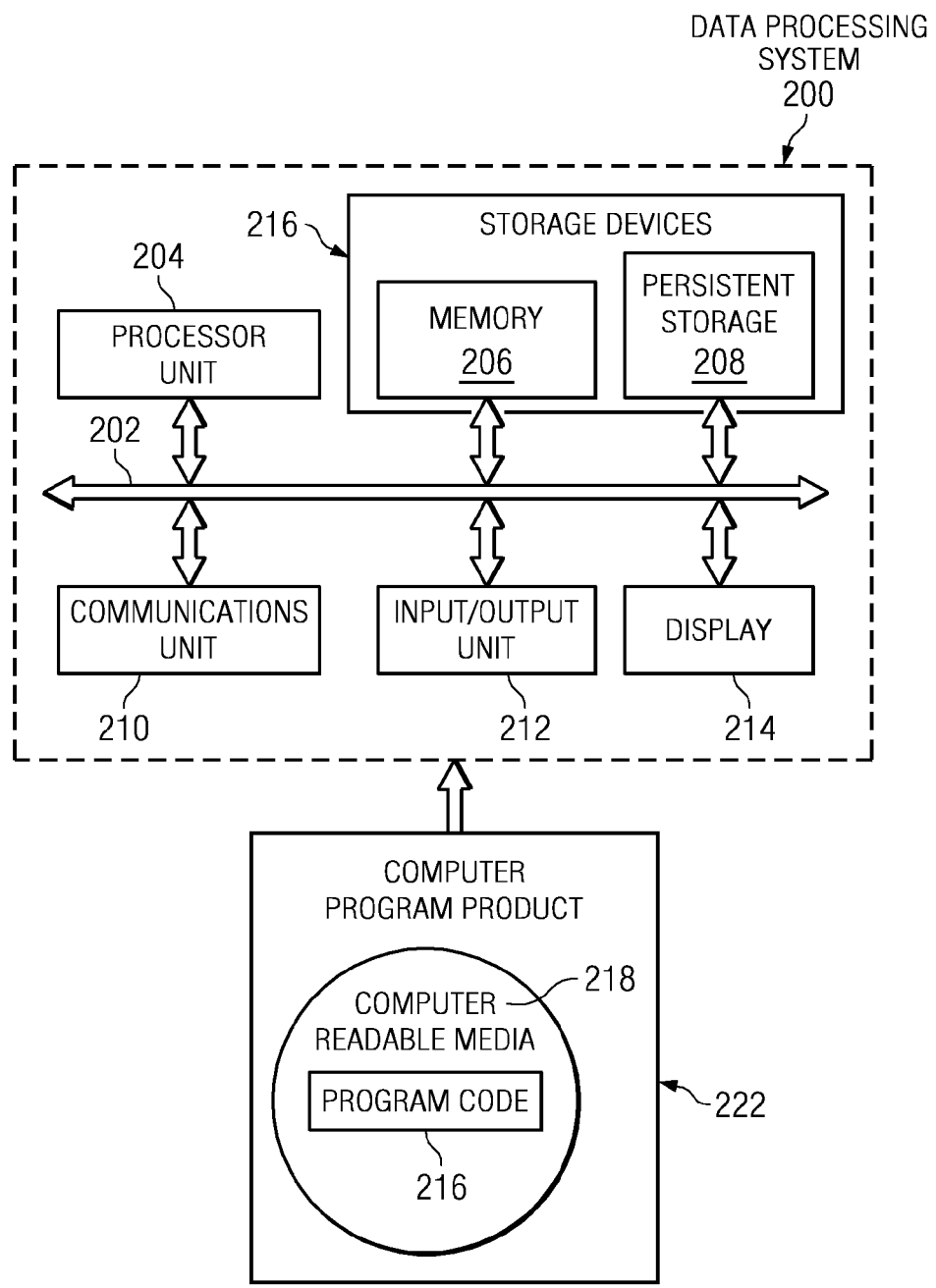
FIG. 2 is a block diagram of a data processing system in which an illustrative embodiment may be implemented.

With reference now to the figures, and in particular with reference to FIGS. 1-2, example diagrams of data processing environments are provided in which illustrative embodiments may be implemented. It should be appreciated that FIGS. 1-2 are only examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications, such as electronic mail applications and calendar applications, to clients 110, 112, and 114. Clients 110, 112, and 114 are clients to server 104 in this example. The illustrative embodiments within network data processing system 100 provide a capability to receive an instruction string to modify the execution of a computer program. In particular, one or more illustrative embodiments may be implemented on a number of computers, such as, for example, server 104 and/or client 110. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 222 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize a need for providing the capability to modify a computer program while the computer program is executing. This capability is provided by coding the computer program with virtual types. Virtual types provide the capability to change the execution of the computer program without stopping or interrupting the execution of the computer program. This eliminates the need to stop the computer program, install a packaged fix, and then restart the computer program. This capability allows for a software developer or technical support to implement modifications and/or to correct defects in the computer program. Therefore, illustrative embodiments provide a method, computer program product, data processing system, and apparatus for modifying a computer program.

Figure 3:
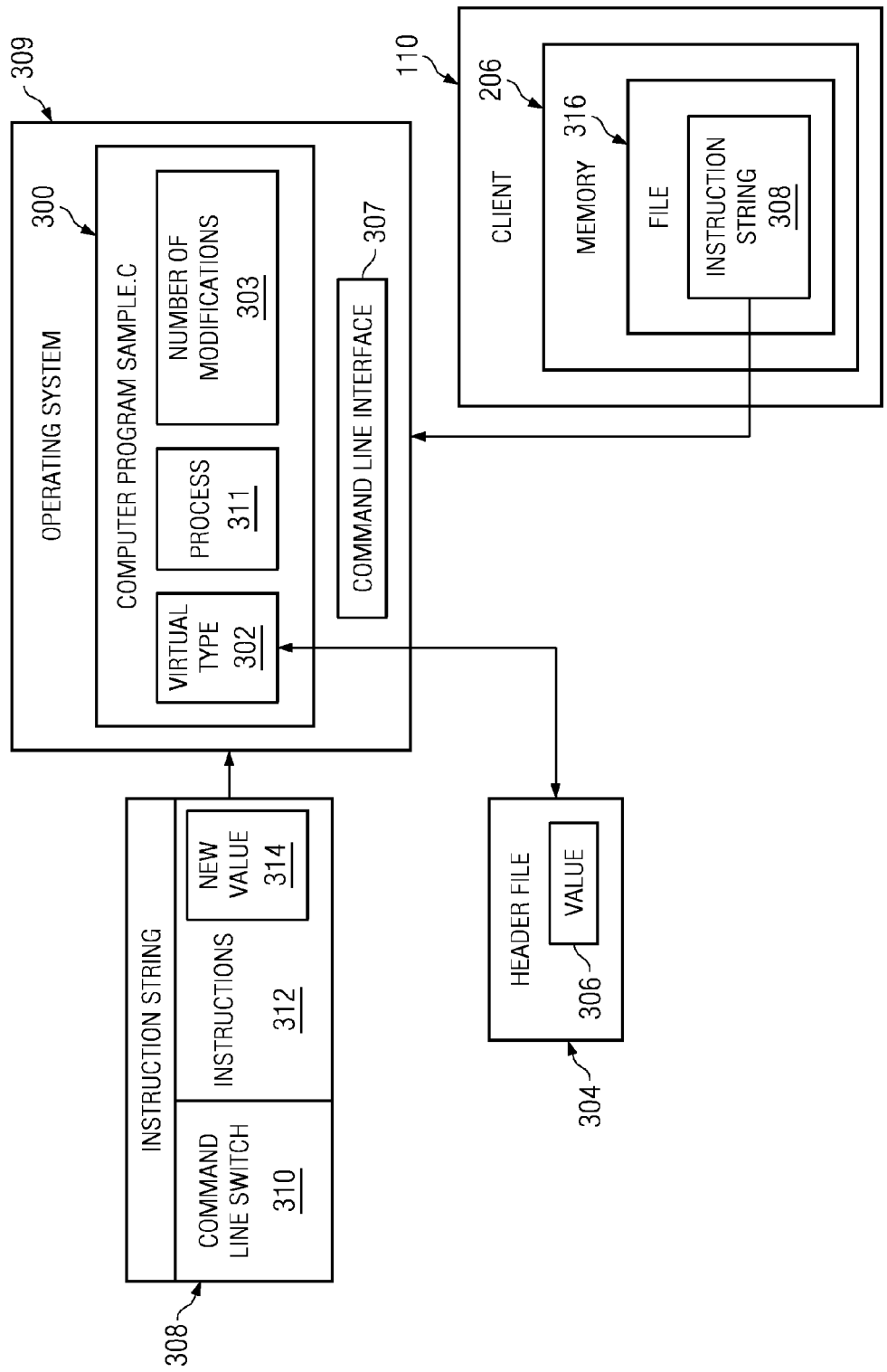
FIG. 3 is a block diagram of a process for modifying a computer program in accordance with the illustrative embodiments.

With reference now to FIG. 3, a block diagram of the process for modifying a computer program, in accordance with the illustrative embodiments, is shown. In FIG. 3, computer program 300 may be created using the C programming language. The process illustrated in FIG. 3 may be implemented in a data processing system, such as data processing system 200 in FIG. 2. However, the different illustrative embodiments disclosed herein may be implemented using other programming languages. These other programming languages may be, for example, object-oriented and/or procedural programming languages.

Computer program 300 may include virtual type 302. A virtual type is an attribute that may be present in computer program 300 that is capable of being changed during execution of computer program 300 to modify the behavior of computer program 300. This change in behavior may be a change in the execution of computer program 300 that may, for example, provide a different result, avoid an error, and/or change a sequence of instruction execution within computer program 300. Virtual types provide the capability to make a number of modifications 303 to computer program 300 without halting and/or interrupting the execution of computer program 300. A number as used herein refers to one or more items. For example, number of modifications 303 is one or more modifications. Computer program 300 may have a number of virtual types. A virtual type, such as virtual type 302, may be, for example, attributes, such as constants, variables, operands, and inequalities. Virtual type 302 may be in the following format:
[VIRTUAL TYPE NAME](position in code, virtual type expressions . . . ).

Header file 304 is a data structure stored in a memory, such as memory 206 of FIG. 2. Header file 304 is associated with computer program 300 when computer program 300 is compiled. When header file 304 is associated with computer program 300, the contents of header file 304 are copied into computer program 300. In the illustrative embodiments, header file 304 may be, for example, without limitation, a linked list, a table, and/or an array. Header file 304 may include value 306. Value 306 is a value assigned to virtual type 302.

Computer program 300 is written and/or modified using virtual types in these illustrative examples. Virtual type 302 allows computer program 300 to receive instruction string 308 from command line interface 307 of operating system 309. Computer program 300 also may include process 311 that allows computer program 300 to recognize command line options. These options are also referred to as command line arguments or command line switches. Process 311 may also allow for modifications to made to computer program 300 during the execution of computer program 300.

Instruction string 308 may be formatted in a number of different ways. In these illustrative examples, instruction string 308 is coded in a command line format and may have a number of command line switches and instructions, such as command line switch 310 and instructions 312. For example, a number of command line switches is one or more command line switches. In these illustrative examples, instruction string 308 is coded in a command line format. The command line format may be as follows: sample-s "vtcmp(5,1)," where sample is computer program 500 that is executing in the data processing system,-s is command line switch 310, vtcmp is an example of a virtual type, such as virtual type 302, defined in computer program 500, and (5,1) are the instructions, such as instructions 312, indicating new value 314 to replace value 306 currently assigned to virtual type vtcmp.

When instruction string 308 is received by computer program 300 using command line interface 307, process 311 in computer program 300 reads instruction string 308 to identify virtual type 302 that is to be modified. Process 311 replaces value 306 with new value 314.

The illustration in FIG. 3 is not meant to imply physical or architectural limitations to the manner in which different illustrative embodiments may be implemented. Other components in addition and/or in place of the ones illustrated may be used. Some components may be unnecessary in some advantageous embodiments. Also, the blocks are presented to illustrate some functional components that may be combined and/or divided into different blocks when implemented in different advantageous embodiments. For example, in this illustrative example, instruction string 308 is sent to computer program 300 using command line interface 307 of operating system 309. In other illustrative embodiments, instruction string 308 may be retrieved from file 316 that is stored in a memory, such as memory 206 of FIG. 2, of a computer system, such as clients 110, 112, 114 of FIG. 1. File 316 may have a number of instruction strings, such as instruction string 308. File 316 may be deployed by manually loading file 316 in the client computer 110, 112, 114 via loading a storage medium such as a CD, DVD, and/or some other suitable storage device into the client computer 110, 112, 114. File 316 may also be automatically and/or semi-automatically deployed into a client computer 110, 112, 114 by sending instruction string 308 to a central server, such as server 106 of FIG. 1, or group of central servers. File 316 may be downloaded from the central server or group of central servers into the client computer and stored in the memory of the client computer 110, 112, 114. Additionally, file 316 may be sent to the client computer 110, 112, 114 using a file transfer protocol application. In these illustrative embodiments, the address and/or path where file 316 is stored in client computer 110, 112, 114 may be written in computer program 300. When an execution of computer program 300 is initiated, computer program 300 uses this address to locate file 316.

In another illustrative embodiment, instruction string 308 may be sent to the client computer 110, 112, and 114 using electronic mail. Instruction string 308 may be either detached to a directory or loaded into a directory by a button, menu option or other action on the electronic mail application that detaches instruction string 308 into a directory of the client computer. In yet another alternative embodiment, the instruction string 308 may be 'piped' to the computer program from another computer program. Piping is a well known technique for passing information from one computer program to another computer program. In this illustrative embodiment, instruction string 308 may be sent out from one computer program and input into executing computer program 300.

Figure 4:
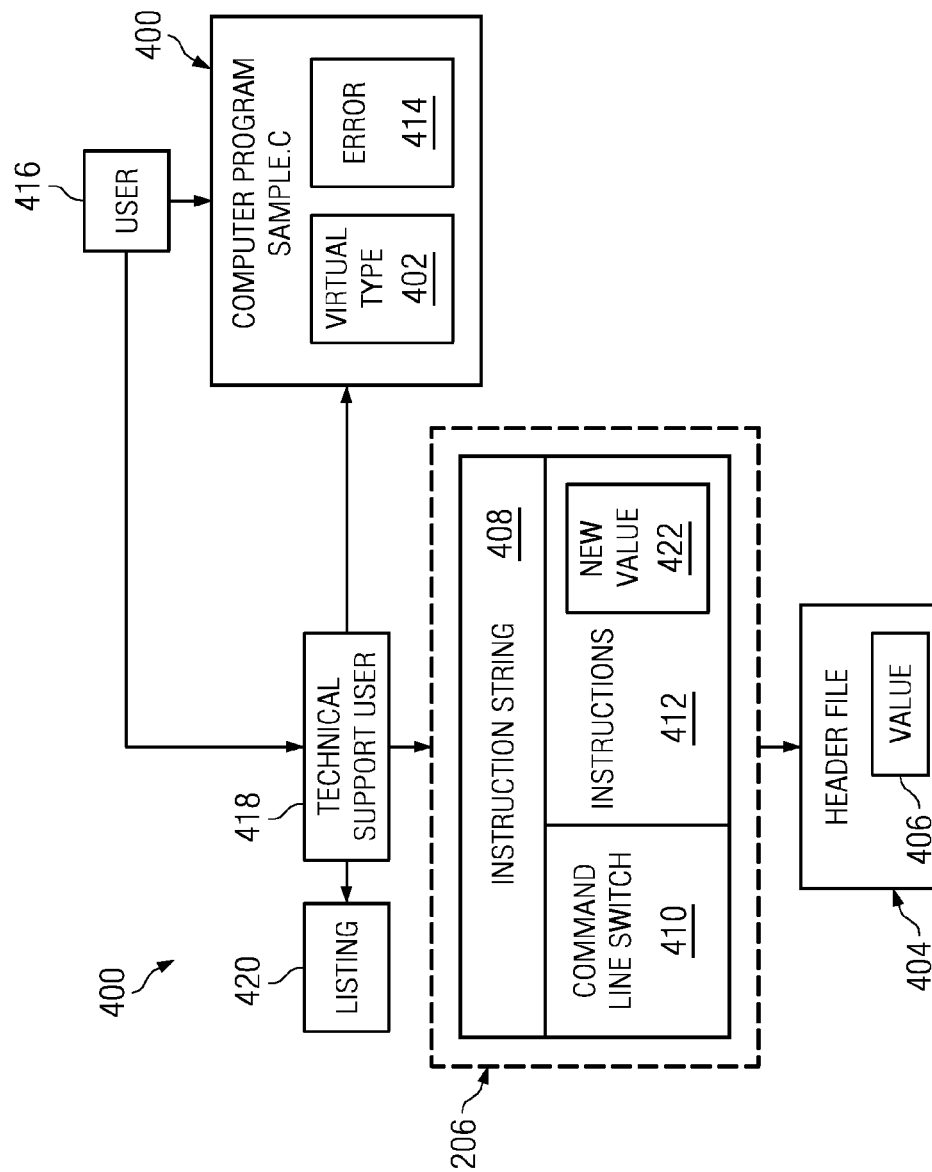
FIG. 4 is a block diagram of a process for modifying a computer program in accordance with an illustrative embodiment.

With reference now to FIG. 4, a block diagram of a process for modifying a computer program in accordance with an illustrative embodiment is shown. In this illustrative example, process may be used change execution of program 400 to correct errors and/or other anomalies in the execution of computer program 400.

Computer program 400 is written and/or modified with virtual type 402 in these illustrative examples. Header file 404 may have value 406. Value 406 is a value assigned to virtual type 402. Header file 404 is a data structure stored in a memory, such as memory 206 of FIG. 2.

In this example, error 414 occurs during execution of computer program 400. Examples of errors that may occur include, for example, without limitation, a regression defect, a buffer overflow, a concurrency violation, and/or an incorrect output. Error 414 may be detected by user 416 executing computer program 400 on a client computer system, such as client 110, 112, and 114 of FIG. 1. Computer program 400 may also be executed by technical support user 418.

Error 414 may be reported to technical support user 418 by user 416. In these illustrative examples, user 416 may report error 414 to technical support user 418 in a number of different ways, such as, for example, without limitation, by calling technical support user 418 to report the error 414, by sending technical support an electronic mail message, and/or by sending a packet via a network port, such as input/output unit 212 of FIG. 2.

Because computer program 400 has been written with virtual type 402, technical support user 418 is provided the capability to quickly identify areas of computer program 400 where error 414 may be occurring. To identify where error 414 is occurring in computer program 400, technical support user 418 may generate a listing, such as listing 420, of all virtual types that are currently coded in computer program 400. Listing 420 lists virtual type 402 coded in computer program 400. Listing 420 also lists value 406 assigned to virtual type 402. Listing 420 may be generated by submitting an instruction string, such as instruction string 408, from the command line of the operating system in which computer program 400 is executing.

When technical support user 418 has identified virtual type 402, technical support user 418 is able to identity a modification for computer program 400 to correct error 414 from occurring in computer program 400. Technical support user 418 communicates to user 416 that instruction string 408 needs to be submitted to computer program 400.

In one illustrative embodiment, instruction string 408 is submitted to computer program 400 from a command line of an operating system. Instruction string 408 is coded in a command line format and may have command line switch 410 and instructions 412. When instruction string 408 is received by computer program 400, computer program 400 reads instruction string 408 and identifies virtual type 402. Computer program 400 replaces value 406 currently assigned to virtual type 402 with new value 422. This modification may be made in computer program 400 without stopping or interrupting the execution of computer program 400.

The illustration of components in FIG. 4 is not meant to imply physical or architectural limitation to the manner in which different advantageous embodiments may be implemented. Components in addition to or in place of the ones illustrated may be present in some illustrative embodiments. Some components may be omitted in other advantageous embodiments. Also, some components may be combined or divided into separate components in some illustrative embodiments. For example, user 416 may be a program rather than a human operator in some illustrative embodiments. In other illustrative embodiments, technical support user 418 may be another program in addition to computer program 400 rather than a human operator.

Figure 5:
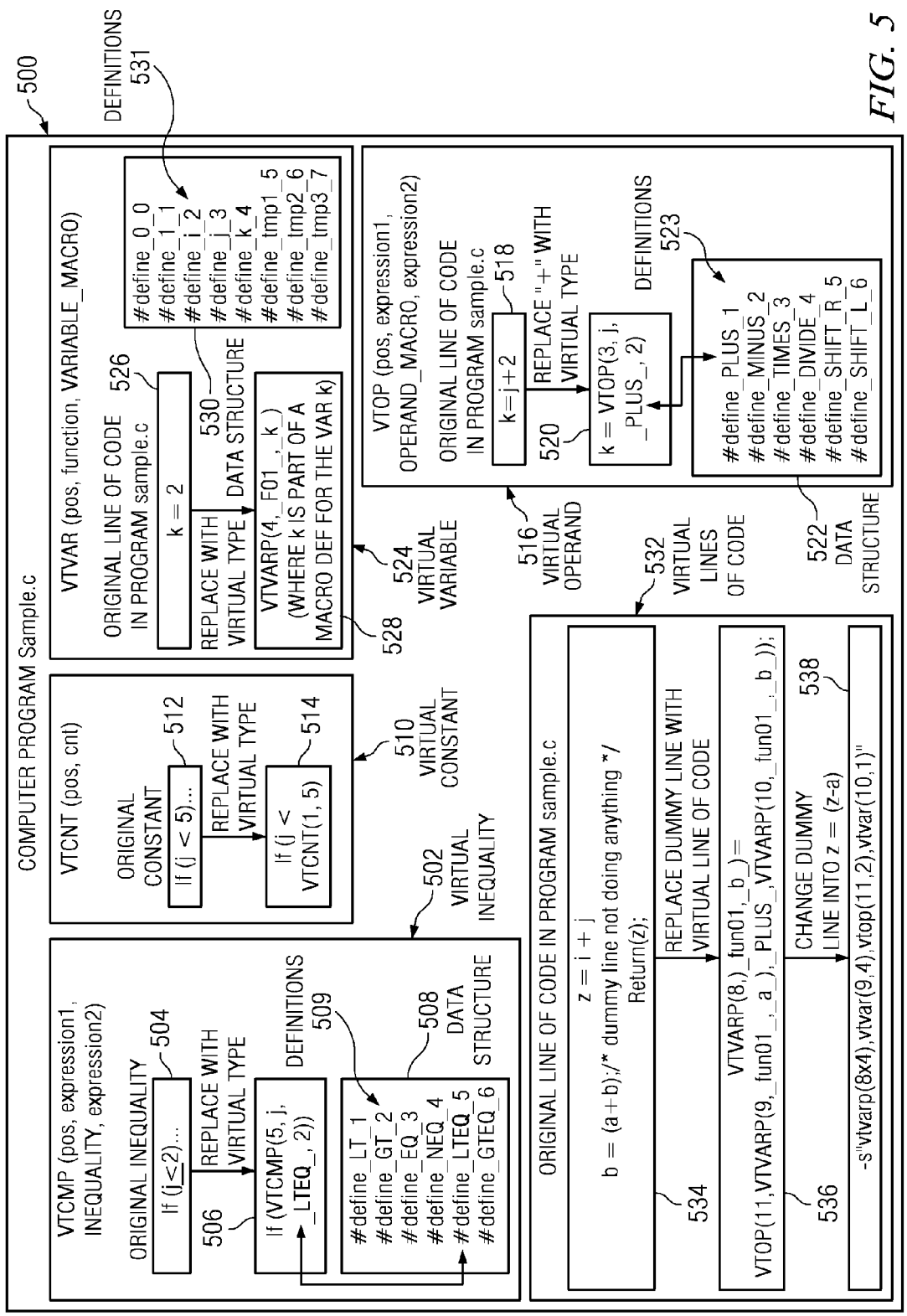
FIG. 5 is a block diagram of virtual types which may be implemented in illustrative embodiments.

With reference now to FIG. 5, a block diagram of virtual types which may be implemented in illustrative embodiments is shown. Computer program 500 in this illustrative example may be written in the C programming language. Computer program 500 may include a virtual type, such as virtual type 402 in FIG. 4. Computer program 500 may have a number of virtual types. In these illustrative embodiments, examples of virtual type 402 in FIG. 4, may be, for example, without limitation, an attribute such as virtual inequality 502, virtual constant 510, virtual operand 516, virtual variable 524, and virtual lines of code 532.

Virtual inequality 502 allows a computer program developer to replace a comparison symbol, such as =, <, >, ==, >=, and <=, with a virtual inequality. Virtual inequality 502 is defined as VTCMP(pos, expression 1, INEQUALITY, expression 2), where pos represents position number in the computer program 500 where an inequality exists. The remaining arguments in this definition are parts of the inequality expression.

For example, assume that computer program 500 has been originally written with inequality 504, "if (j≤2)." Inequality 504 may be replaced with virtual inequality 506. Virtual inequality 506 is formatted as, "If (VTCMP(5,j,_LTEQ_, 2)", where _LTEQ_ is the inequality and 5 is the position number of this virtual inequality as defined in data structure 508.

Data structure 508 may be defined in a header file, such as header file 404, of FIG. 4. Data structure 508 may have a number of definitions, such as definitions 509 used to express virtual inequalities. For example, data structure 508 may have:

define_LT_1
define_GT_2
define_EQ_3
define_NEQ_4
define_LTEQ_5
define_GTEQ_6

To change inequality 504 from "<=" to "<", the following instruction string may be submitted to computer program 500: sample-s "vtcmp(5,1)". When this instruction string is received by computer program 500, the inequality in position 5, "<=" is replaced by the value "<." The value of "<" is defined in data structure 508 as #define_LT_1, which is located in position 1 of data structure 508. Computer program 500 now executes as if computer program 500 had been originally written with the inequality "j<2" instead of "j≤2".

Virtual constant 510 allows the developer to replace any constant with a virtual constant. Virtual constant 510 is defined as VTCNT(pos,cnt) where pos represents position number and cnt represents the value for the constant at that position. For example, assume that computer program 500 was originally coded with statement 512 "if (j<5)." This statement may be replaced with a virtual constant, such as virtual constant 514. Virtual constant may be formatted as, "If (VTCNT(1,5)", where 1 is the position number of the virtual constant, and "5" is the value assigned to virtual constant 514.

To change the constant from 5 to 9, in statement 512, the following instruction string may be submitted to computer program 500: sample-s"vtcnt(1,9)." When the instruction string is received, the constant in position 1 of computer program 500 is changed from the value of 5 to the new value of 9. Computer program 500 will now run as if computer program 500 had been originally written with the value of 9 for the constant in position 1.

Virtual operand 516 allows replacement of an operand written in computer program 500. For example, the operand may be +, −, *, and /. Virtual operand 516 is defined as VTOP(pos, expression 1, INEQUALITY, expression 2), where pos represents position number in the computer program code where an inequality exists, where each instantiation of the operand has a different position number. The remaining arguments are parts of the operand expression.

For example, assume that computer program 500 was originally written with statement 518, "k=j+2." Statement 518 may be replaced with virtual operand 516. Virtual operand 516 may be formatted as virtual operand 520, "k=VTOP (3,j,_PLUS_,2)", where _PLUS_ is the operand and 2 is the position number of this virtual operand defined in data structure 522. Data structure 522 may be defined in a header file, such as header file 404. Data structure 522 may have a number of definitions, such as definitions 523, used to express virtual operand 516. For example, data structure 522 may have:
define_PLUS_1
define_MINUS_2
define_TIMES_3
define_DIVIDE_4
define_SHIFT_R_5
define_SHIFT_L_6

To change virtual operand 516 from "+" to "*", the following instruction string may be submitted to computer program 500: sample-s "vtcop(3, 3). When this instruction string is received by computer program 500, the operand in position 3, "+," is replaced with the value of "*." The value, "*," is defined in data structure 522 as #define_TIMES_3. Computer program 500 now runs as if computer program 500 had been originally written with the value of "*", instead of "+."

Virtual variable 524 allows replacement of a variable written in computer program 500. Virtual variable 524 is defined as VTVAR(pos, function, VARIABLE_MACRO), where pos represents position number of the variable in the computer program 500, where each instantiation has a different position number. Function is the function number indicating which function the variable is in. VARIABLE_MACRO is a macro that represents the variable in computer program 500.

For example, assume that computer program 500 was originally written with statement 526 "k=2". In this statement the variable "k" is assigned the value of 2. This variable may be replaced with a virtual variable, such as virtual variable 528. Virtual variable 528 may be formatted as "VTVAR(4,_F01_,_k_)=2". Variable definitions may be stored in a data structure, such as data structure 530. Data structure 530 may have a number of variable definitions, such as definitions 531. For example, data structure 530 may have:
define_0_0
define_1_1
define_i_2
define_j_3
define_k_4
define_tmp1_5
define_tmp2_6
define_tmp3_7

To change virtual variable 528 from "k" to "i," the following instruction string may be submitted to computer program 500: sample-s "vtvar(4,2)". When this instruction string is received by computer program 500, the variable in position 4 of computer program 500 is changed from the value of "k" to the new value of "i." With this change, computer program 500 now runs as if computer program 500 had been originally written with the value of "i" instead of "k."

Virtual lines of code 532 provide the capability to a computer program developer to include additional lines of code in computer program 500. These extra lines of code do not perform any action or process, by default, but may be assigned values of variables, constants, inequalities, and operands. For example, assume that computer program 500 has function 534. Function 534 does not perform any specific action or process. Function 534 may be replaced with virtual lines of code, such as virtual lines of code 536. Virtual lines of code may be formatted as "VTVARP(8,)_fun01,_b_)=VTOP (11,VTVARP(9,_fun01_,_a_),_PLUS_,VTVARP(10, fun01_,_b_))." Virtual types may be written individually or in a nested format as illustrated in virtual lines of code 536.

To change the first line of function 534 from z=i+j to z=(z−a), an instruction string, such as instruction string 538, may be submitted to computer program 500. When instruction string 538 is received by computer program 500, computer program 500 replaces each value assigned to each virtual type in function 534 with new values identified in the instruction string. Computer program 500 will now execute as if computer program 500 had been originally written with lines of code 538.

Figure 6:
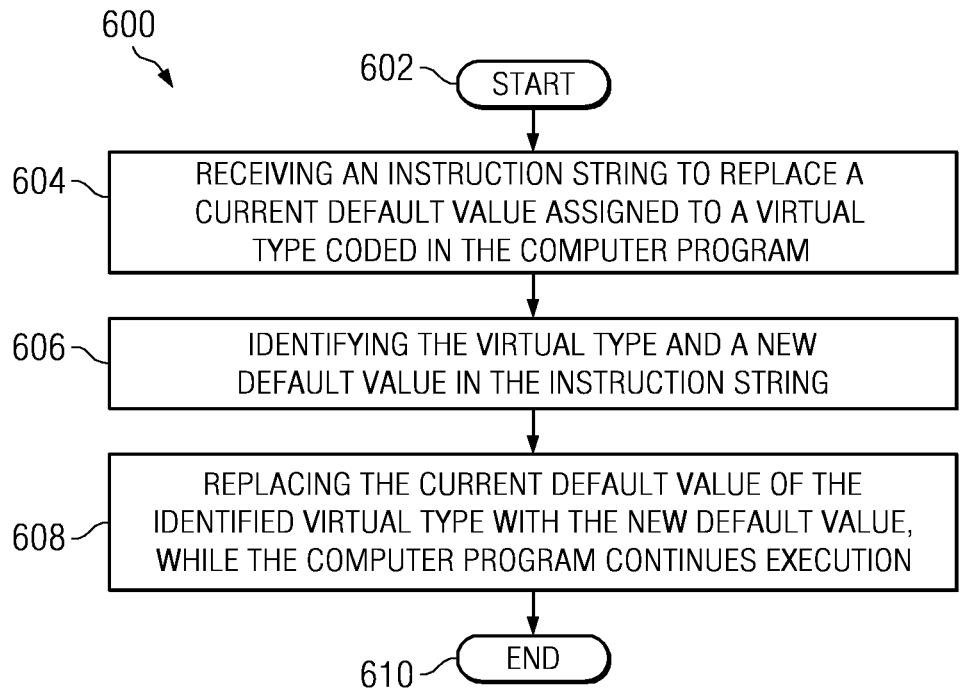
FIG. 6 is a flowchart illustrating a process for modifying a computer program while the computer program is executing in accordance with an illustrative embodiment.

With reference now to FIG. 6, a flowchart illustrating a process for modifying a computer program while the computer program is executing is depicted. The process illustrated in FIG. 6 is a more detailed process for process 311 of FIG. 3.

The modification of the computer program begins (step 602) with receiving an instruction string to replace a value assigned to a virtual type coded in the computer program (step 604). The computer program may have been coded with a number of virtual types. Examples of virtual types include, for example, without limitation, virtual inequalities, virtual constants, virtual operands, virtual variables, and virtual lines of code.

Responsive to receiving the instruction string, the virtual type and a new value are identified (step 606). The new value will be used to replace the value currently assigned to the virtual type coded in the computer program. Responsive to identifying the virtual type and the new value, the value is replaced (step 608), resulting in the computer program being modified. This modification to the computer program is made during an execution of the computer program without stopping and/or interrupting the computer program execution. The process ends thereafter (step 610).

Figure 7:
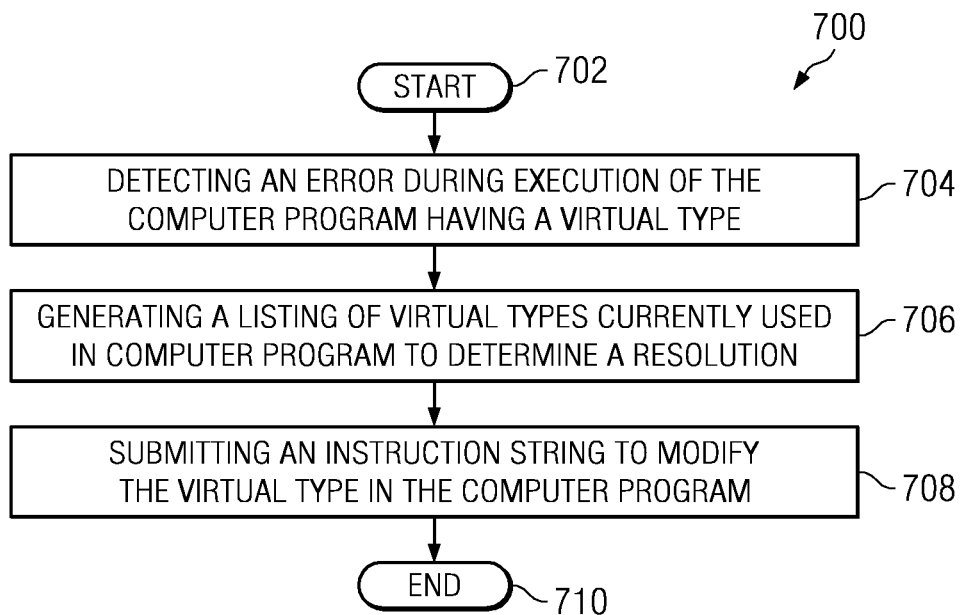
FIG. 7 is a flowchart illustrating a process for modifying a computer program to resolve an error while the computer program is executing in accordance with an illustrative embodiment.

FIG. 7 is a flowchart illustrating a process for modifying a computer program to resolve an error while the computer program is executing. The process illustrated in FIG. 7 is a more detailed process for process 311 of FIG. 3.

During an execution of a computer program, coded with a number of virtual types, an error is detected (step 704). The error occurring in the computer program may be detected by a user executing the computer program, such as user 416 of FIG. 4. The error may also be detected by a technical support user reviewing the execution of the computer program, such as technical support user 418 of FIG. 4.

In another illustrative embodiment, the error may be detected by an error detection process. For example, a user executing the computer program determines the computer program is outputting incorrect information. The user reports the error to the technical support user responsible for reviewing and maintaining the computer program. To identify a resolution for the error, the technical support user may generate a listing (step 706). The listing lists each virtual type and the values assigned to each virtual type currently being used in the computer program. This listing is used by the technical support user to determine in which virtual type the error is occurring. For example, assume the technical support user determines that position 1 of a virtual constant coded in the computer program needs to be changed from 3 to 4 to resolve the error. The technical support user may instruct the user to submit an instruction string, such as './virtual_type_test-l-s"vtcnt(1,4)."' When the instruction string is received by the computer program, the value currently assigned to the virtual constant is replaced by the new value indicated in the instruction string (step 708).

With reference now to FIG. 8, a computer program code listing, in accordance with illustrative embodiments, is shown. Code 800 in FIG. 8 is example of one implementation of computer program 400, as depicted in FIG. 4. Code 800 may be created using the C programming language. However, the different illustrative embodiments disclosed herein, may be implemented using other programming languages. The other programming languages may be, for example, object-oriented and/or procedural programming languages. Code 800 may have virtual types, such as statements 804, 806, and 808. Statement 808 illustrates coding virtual types in a nested format.

A computer program with virtual types is modified using an instruction string, such as instruction string 308 of FIG. 3. The instruction string may have command line switches and instructions. When an error occurs in the computer program, the error may be communicated to the technical support user responsible for debugging and maintaining the computer program. The error may also be detected by a user executing the computer program. For example, a user executing the computer program notices an area in the code that is outputting incorrect information. The user may call technical support to notify them of the error and inquire whether a resolution may be determined. To determine a resolution for the error, the technical support may ask the user to submit an instruction string. In illustrative embodiments, the computer program is able to generate this listing because of programming code in the computer program that allows the computer program to recognize command line options for generating a listing of all virtual types in use in computer program, the '1' option. The computer program may also have programming code that allows the computer program to recognize a command line options for receiving a character string, submitted to the computer program. Examples of programming code for generating a list and receiving a character string are illustrated in statements 802.

Technical support uses the generated listing to determine in which virtual type the error is occurring. An instruction string containing the resolution for the error is submitted to the computer program. The instruction string may have a new value that will override the value currently assigned to the virtual type coded in the computer program. The instruction string is submitted, using a command line, while the computer program continues to execute. When the computer program receives the instruction string, the value currently assigned to the virtual type is replaced by the new value indicated in the instruction string. The computer program executes as if the program had been originally compiled with the new value contained in the instruction string.

With reference now to FIG. 9, a computer program code listing of a header file, which is associated with a computer program, in accordance with illustrative embodiments, is shown. Header file 900 is an example of an implementation of header file 304 in FIG. 3. Header file 900 may have definitions of virtual types and values for each virtual type coded in a computer program. Header file 900 is stored in a memory of a data processing system, such as memory 206 of FIG. 2, and is referenced by a computer program using a "#include" statement. The "#include" statement tells the compiler to insert the contents of the header file into the computer program.

The illustrative embodiments recognize a need for providing the capability to modify a computer program while the computer program is executing. This capability is provided by coding the computer program with virtual types. Virtual types provide the capability to change the execution of the computer program without stopping or interrupting the execution of the computer program. This change in the execution of the computer program is accomplished by submitting an instruction string to the computer program. When the instruction string is received by the computer program, the value currently assigned to the virtual type is replaced with the new value indicated in the instruction string. The functionality provided by coding a computer program with virtual types eliminates the need to stop the computer program, install a patch for the computer program, and then restart the computer program, and/or reboot the computer system the computer program is executing on. This capability allows for a software developer or technical support user to provide a quick response to user reported errors occurring in the computer program and/or requests for modifications to the computer program.

The flowchart and block diagrams in the Figures illustrate the architecture, functionality, and operation of possible implementations of systems, methods and computer program products, according to various embodiments of the present invention. In this regard, each block in the flowchart or block diagrams may represent a module, segment, or portion of code which may have one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

Embodiments of the invention may take the form of an entirely hardware embodiment, an entirely software embodiment or an embodiment containing both hardware and software elements. In an embodiment the invention is implemented in software, which includes but is not limited to firmware, resident software, microcode, etc.

Furthermore, embodiments of the invention may take the form of a computer program product accessible from a computer-usable or computer-readable storage medium providing program code for use by, or in connection with, a computer or any instruction execution system. For the purposes of this description, a computer-usable or computer-readable storage medium may be any tangible apparatus that may contain, store, communicate, or transport the program for use by, or in connection with, the instruction execution system, apparatus, or device.

The medium may be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of embodiments of the present invention has been presented for purposes of illustration and description, and is not intended to be exhaustive or limited to the invention in the form disclosed. Many modifications and variations will be apparent to those of ordinary skill in the art. The illustrative examples described a modification of a computer program in which an error occurred. Other illustrative embodiments implement modifications to a computer program in response to instruction received from a technical support user. For example, without limitation, one or more illustrative embodiments may be used to update a computer program, upgrade the computer program, enable features in the computer program, disable features in the computer program, and/or other suitable modifications to the computer program. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A method for modifying a computer program, the method comprising:
    replacing a number of original code segments in the computer program with a number of virtual types that receive new values for current values from instruction strings that interact with the number of virtual types during execution of the computer program;
    utilizing a header file associated with the computer program to define a number of values that correspond to the number of virtual types;
    receiving an instruction string that includes a command line switch, a new value for a virtual type, and instructions to replace a current value in the virtual type with the new value; and
    utilizing the header file to replace, responsive to the instructions, the current value in the virtual type with the new value, wherein the new value modifies the computer program, and wherein the computer program is modified while the computer program is executed by a processor unit.

2. The method of claim 1, wherein the receiving the instruction string step further comprises:
    responsive to receiving the instruction string, identifying the virtual type and the new value for the virtual type using the instruction string.

3. The method of claim 1, wherein the utilizing the header file to replace, responsive to the instructions, the current value in the virtual type with the new value step further comprises:
    replacing the current value in the virtual type with the new value identified in the instruction string using a process embodied in the computer program.

4. The method of claim 1, wherein the virtual type is one of a virtual constant, a virtual inequality, a virtual operand, a virtual variable, and virtual lines of code.

5. The method of claim 3, wherein the process embodied in the computer program reads the instruction string and replaces the current value in the virtual type with the new value.

6. The method of claim 2, wherein the instruction string is submitted to the computer program using a command line interface associated with an operating system.

7. A method for deploying modifications to a computer program, the method comprising:
    receiving an identification of an error in a computer program having a virtual type while the computer program is executed by a processor unit;
    responsive to receiving the identification of the error, identifying a modification for the computer program to fix the error; and
    sending an instruction string that includes a command line switch, a new value for the virtual type, and instructions to replace a current value in the virtual type with the new value to the computer program to fix the error, wherein the instructions utilize a header file that defines a number of values corresponding to a number of virtual types in the computer program to replace the current value in the virtual type with the new value, and wherein the current value in the virtual type is replaced with the new value for the virtual type while the computer program is executed by the processor unit.

* * * * *